United States Patent Office 3,000,505
Patented Sept. 19, 1961

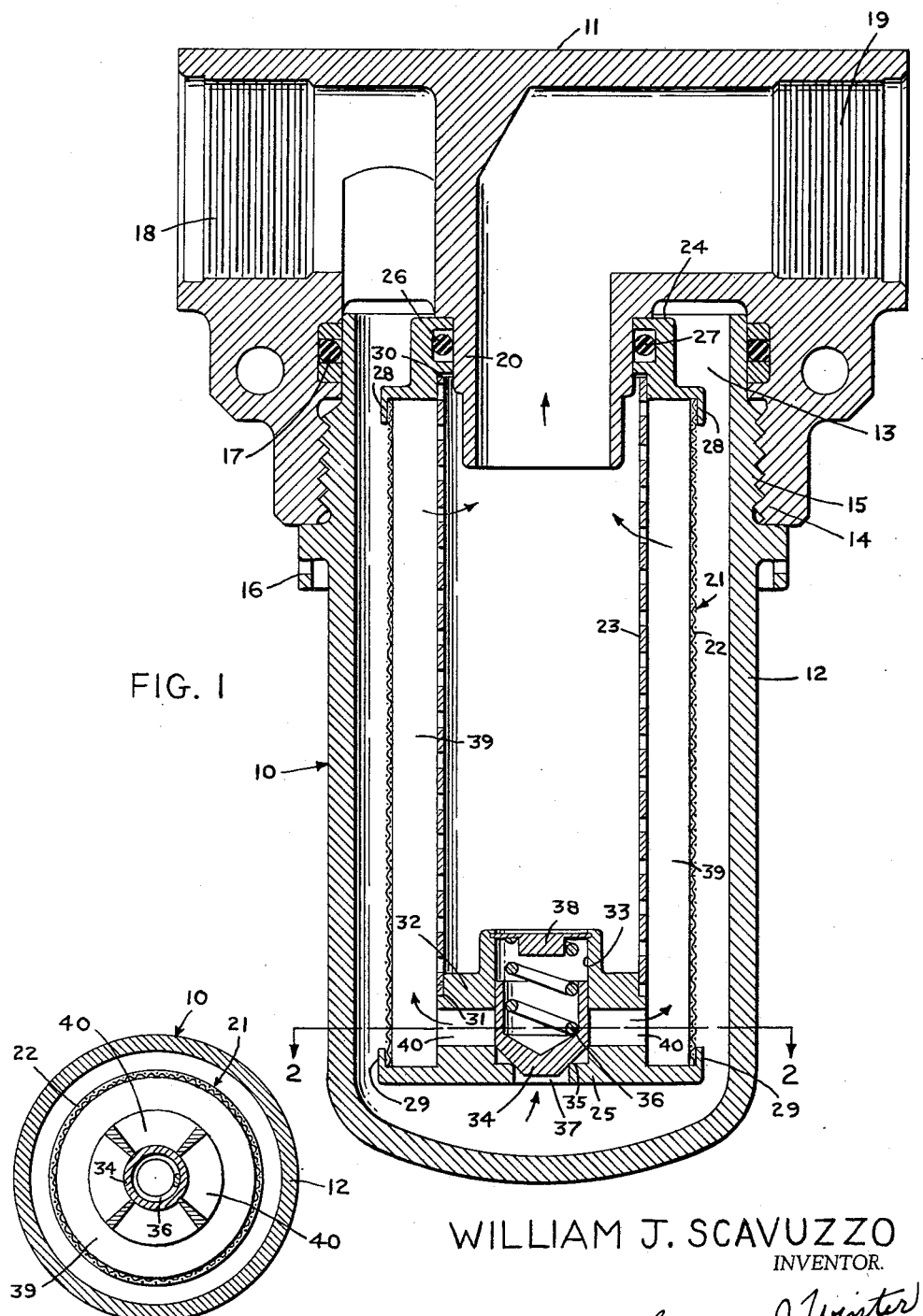

3,000,505
FILTER UNIT
William J. Scavuzzo, Clark, N.J., assignor to Purolator Products, Inc., Rahway, N.J., a corporation of Delaware
Filed May 22, 1958, Ser. No. 737,165
1 Claim. (Cl. 210—132)

The present invention relates to a filter, and more particularly to a filter unit used in high pressure systems.

In certain filter systems, it is necessary that the fluid used therein be carefully filtered to the finest degree possible in order to avoid mechanical failure of the mechanism which the fluid serves or lubricates by reason of the presence of solid impurities or contaminants which may damage the mechanism so that it will not operate. For example, in aircraft systems such as aircraft landing gear systems, aircraft cowl flap systems, and in other aerodynamic systems and airborne equipment, the passage of solid materials or contaminants through the system may be of such a critical nature as to cause ultimate failure of the aircraft itself due to the filter unit not performing its essential function. For this reason, it is necessary that the filter unit be changed or cleaned before the critical period is reached. This period may occur when the filter unit either becomes clogged so that no fluid passes therethrough, or the filter unit permits solid material or impurities in the fluid to pass through the system by way of a relief valve causing failure of the mechanism.

As already stated, in airborne equipment where forces of gravity must be taken into consideration the failure of the mechanism cannot be tolerated once for if the mechanism fails to operate because it is starved of essential operating fluid, or if a relief valve permits solid material to pass to the mechanism and cause failure of it, the same disastrous end result is achieved.

An object of the present invention is to provide a filter unit having secondary filter means therein which comes into operation when the primary filter becomes clogged and hence, keeps the mechanism which the filter unit serves in operation for a prolonged period until the inoperative filter can be taken out of operation and cleaned or replaced.

Another object of the present invention is to provide a filter unit having safety means therein which permits bypassing of the primary filter unit and permits a secondary filter system to operate when the pressure drop through the primary filter exceeds a predetermined value.

A further object of the present invention is to provide a filter unit having two filters therein which operate in tandem sequence.

Yet, another object of the present invention is to provide a safety filter unit which will continuously operate beyond its normal life span because external circumstances do not make it feasible for the clogged filter unit to be cleaned or replaced immediately.

Another feature of the present invention is the provision of a standby filter unit formed integral with a primary filter unit that eliminates the need for having two separate filter units and the bulky auxiliary equipment attendant thereto.

Another object of the present invention is to provide plural filtering means formed integrally with one another with automatic means for placing another filtering means in operation when one filtering means fails.

The invention will be better understood from the following description when considered in connection with the accompanying drawings forming a part thereof, and in which:

FIG. 1 is a vertical sectional view of the filter unit embodying the present invention, and FIG. 2 is a section on a reduced scale, taken on line 2—2 of FIG. 1.

Referring to the drawings, the reference numeral 10 generally designates an hydraulic filter assembly or unit comprising a hollow body or head 11 removably connected to a filter housing or casing number 12.

Head 11 is provided with a centrally disposed bore 13 in the lower portion thereof, internally threaded at 14 to receive the externally threaded upper portion 15 of casing 12. An O-ring seal 17 is disposed in a recess on the inner periphery of bore 13 to prevent leakage of the hydraulic fluid for example, oil, out between the head and filter casing 12. The upper portion of head 11 is provided with horizontal inlet and outlet passages 18 and 19 respectively, through which the high pressure oil to be filtered is passed. A center tube or hollow tubular member 20 extends downwardly from the top of the head and is disposed axially of bore 13. The bore of tubular member 20 communicates with outlet passage 19 while the bore 13 of the head communicates with inlet passage 18 and the interior of casing 12.

A cylindrical filter assembly 21 is disposed within filter casing 12 comprising an outer filter 22 and an inner filter 23 provided with an annular metal end cap 24 on one end thereof and a solid metal end cap 25 on the other end thereof sealing off the ends of the filter. Annular end cap 24 is provided with a recess 26 on the inner periphery thereof in which is disposed an O-ring seal 27 therein. Filter assembly 21 is supported on tubular member 20 with O-ring seal 27 providing a fluid tight seal between the tubular member 20 and end cap 24. Outer filter 22, which constitutes the primary filter comprises a stainless steel woven wire screen filter of 5 micron size which may be pleated or convoluted, if desired. The secondary filter 23 comprises a wire wound stainless steel metal edge type filter of 10 micron size as shown and described in Patent No. 2,622,738 granted December 23, 1952.

The longitudinal ends of filter 22 fit within turned down flanges or rims 28 and 29 of end caps 24 and 25 respectively, and are joined thereto by brazing, welding, or other similar means to prevent the leakage of oil around the edges of the woven screen filter without being filtered.

The upper end of secondary filter 23 fits within end cap 24 against an annular shoulder 30 provided thereon and is also joined thereto in any well known means to prevent leakage of oil between the filter and end cap without first being filtered. The lower edge of filter 23 seats on a shoulder 31 formed on the circular projected central portion 32 of end cap 25 and is secured thereto by brazing, welding or the like to prevent oil from passing between the filter and end cap without being filtered.

Circular portion 32 provides a hollow valve housing 33 in which is disposed a slidable sleeve valve 34 normally maintained in a seated position against a valve seat 35 by compression spring 36 in the housing to close off a central inlet port 37 disposed in end cap 25 during normal operation of the filter. Spring 36 is disposed on a circular boss 38 formed on the inside of the top of the valve housing. Port 37 communicates with the annular chamber 39 formed between filters 22 and 23 through a plurality of horizontal slots or passages 40 provided in portion 32.

In operation, when fluid to be filtered is flowed through filter unit 10, the fluid passes through inlet chamber 18 and into the interior of casing 12 and through the wire cloth filter 22 depositing any solid materials and contaminants on the outer surface thereof. The fluid thereafter passes through the secondary filter 23 and is discharged through tubular member 20 and outlet 19 from the filter unit passing to a point of use of the mechanism which it serves. At this time, the metal edge filter 23 is not performing the function of a filter since the porosity thereof is greater than that in filter 22 and all the solid materials and contaminants have been removed by the primary filter 22. During this period the biasing means 36 in valve housing 33 maintains valve 34 seated so that inlet port 37 is sealed off or closed and no oil will by-pass filter 22.

When filter 22 becomes clogged with contaminants and the pressure drop or pressure differential across it exceeds a predetermined value which is in excess of the force in compression spring 36 maintaining valve 34 seated and port 37 closed, the valve will be moved to an open position and uncover port 37. Thereafter, the oil flowing through the filter unit will pass through by-pass port 37 from the interior of casing 12, flow through horizontal passages 40 and pass into chamber 39 flowing in an outside-in direction through secondary filter 23 so that any solid materials and contaminants in the oil will be deposited on the outer periphery thereof. The clean oil then flows through member 20 and is discharged from the filter unit through outlet 19.

Thus, the present invention provides an integral filter unit having primary and secondary filters therein which will not starve the mechanism the unit is serving of essential fluid and, on the other hand, will not permit the passage of solid material or contaminant thereto to cause a failure in operation of the mechanism.

In addition, the present invention provides a filtering unit having safety means incorporated therein which automatically sends into operation a secondary filter when the primary filter has been clogged increasing the useful life of the filter unit to enable operation of mechanisms it serves until such time as they can be feasibly cleaned or maintained.

Inasmuch as various changes may be made in the form, location and relative arrangement of the several parts without departing from the essential characteristics of the invention, it will be understood that the invention is not to be limited except by the scope of the appended claim.

What is claimed is:

A filter cartridge comprising a cylindrical woven filter member, a cylindrical metal edge filter member disposed concentrically within said outer member and in spaced relationship therewith to provide an annular chamber therebetween, an annular end cap having a central opening therein fixed to the upper ends of said members to seal off the ends thereof and said annular chamber and to provide outlet means for said cartridge, a circular end cap fixed to the lower ends of said members to seal the bottom of said members and chamber, a central projection disposed in said circular end cap extending interiorally of said metal edge member and having a central inlet port in the bottom thereof, horizontal passages extending through said central projection in communication at their outer end with said annular chamber and at their inner end with said inlet port, a by-pass valve disposed in said projection for closing off said inlet port, and biasing means normally maintaining said valve seated over said port to prevent flow through said passages into said annular chamber, whereby said filter members and by-pass valve form an integral unit.

References Cited in the file of this patent

UNITED STATES PATENTS

| | | |
|---|---|---|
| 2,057,219 | Vokes | Oct. 13, 1936 |
| 2,076,935 | Burckhalter | Apr. 13, 1937 |
| 2,743,019 | Kovacs | Apr. 24, 1956 |
| 2,864,505 | Kasten | Dec. 16, 1958 |
| 2,936,893 | Arkoosh et al. | May 17, 1960 |